(12) United States Patent
Delantar, Jr.

(10) Patent No.: US 7,892,624 B2
(45) Date of Patent: Feb. 22, 2011

(54) MOLDED COARSE PARTICLE PRODUCT FOR USE AS HOUSEWARES, FURNITURE OR ARCHITECTURAL COMPONENTS OR THE LIKE

(76) Inventor: Pedro Herrera Delantar, Jr., 300 Bourland Rd., Apartment #1213, Keller, TX (US) 76248

( * ) Notice: Subject to any disclaimer, the term of this patent is extended or adjusted under 35 U.S.C. 154(b) by 190 days.

(21) Appl. No.: 10/250,021

(22) Filed: May 29, 2003

(65) Prior Publication Data

US 2004/0209046 A1    Oct. 21, 2004

(30) Foreign Application Priority Data

Apr. 21, 2003   (PH) .................... 2-2003-00156 U

(51) Int. Cl.
*B32B 5/16*   (2006.01)
(52) U.S. Cl. .......... 428/143; 264/77; 52/315; 428/39; 428/67; 428/146
(58) Field of Classification Search .......... 428/143, 428/39, 67, 146; 264/77; 52/315
See application file for complete search history.

(56) References Cited

U.S. PATENT DOCUMENTS

| | | | | |
|---|---|---|---|---|
| 769,704 A | * | 9/1904 | Mainzer | 52/315 |
| 1,596,482 A | * | 8/1926 | Ewen | 264/74 |
| 2,547,989 A | * | 4/1951 | Wiley | 264/77 |
| 2,645,587 A | * | 7/1953 | Williamson | 106/164.41 |
| 2,649,034 A | * | 8/1953 | Gramelspacher | 428/146 |
| 3,344,011 A | * | 9/1967 | Goozner | 428/67 |
| 4,207,936 A | * | 6/1980 | Arbour | 144/360 |
| 4,233,752 A | * | 11/1980 | Kleinguenther | 34/331 |
| 4,685,255 A | * | 8/1987 | Kelley | 52/36.1 |
| 6,293,065 B1 | * | 9/2001 | Suzuki et al. | 52/315 |

* cited by examiner

*Primary Examiner*—William P Watkins, III
(74) *Attorney, Agent, or Firm*—Fish & Richardson P.C.

(57) ABSTRACT

A molded coarse particle product adapted for use as housewares, furniture or architectural components or the like preferentially made from coarse wood particles, flakes or chips, or any other suitable castable particulate materials such as glass, dried grass, plastic, shell particles or a combination thereof admixed and bonded together with an adhesive binder and lightly pressed into a mold preferably manually, together with a reinforcing means. The resulting surface texture of the cast product has the natural or original characteristics of the preferred particles comprising thereof such that it looks as natural as the said particles when viewed collectively together in plurality, and the quality and degree of roughness being defined by the natural features of said particles.

12 Claims, 3 Drawing Sheets

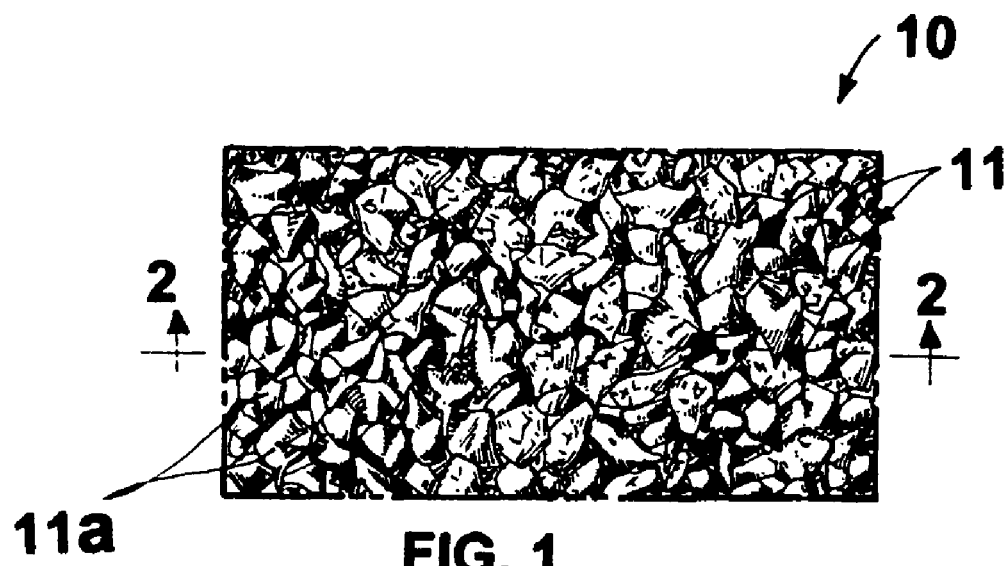
FIG. 1
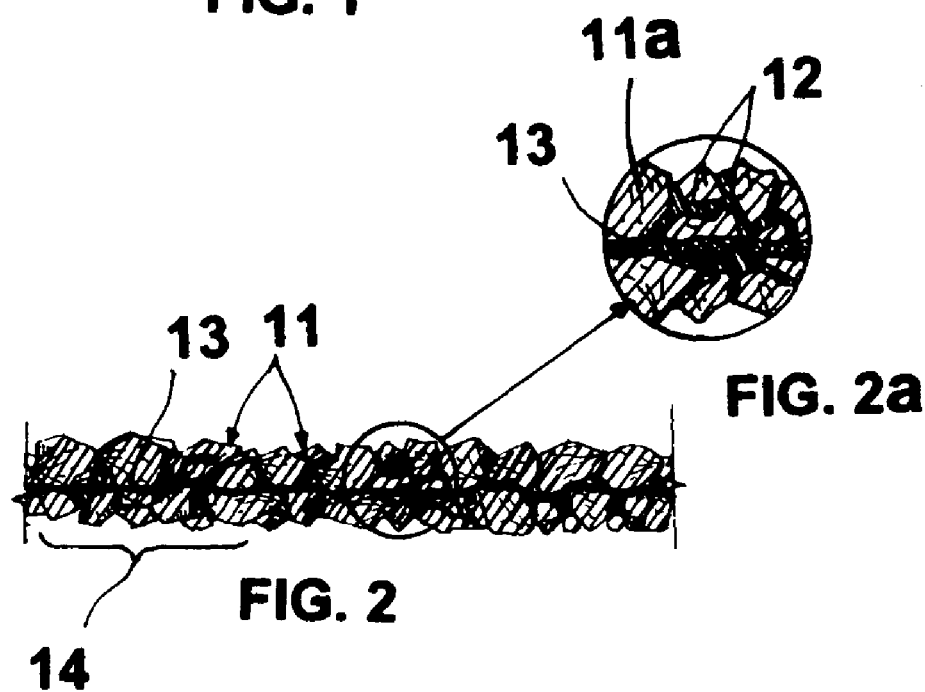
FIG. 2a
FIG. 2

MOLDED COARSE PARTICLE PRODUCT FOR USE AS HOUSEWARES, FURNITURE OR ARCHITECTURAL COMPONENTS OR THE LIKE

BACKGROUND OF INVENTION

In the houseware and furniture industries, most especially in making cast or molded products, the prior art includes highly compressed cast structures made from wood chips or flakes such as the molded product covered by Haataja U.S. Pat. No. 4,384,019 that discloses intersecting cast elongated members formed by generally aligned wood flakes compressed and bonded together with a binder, and integrally joined at the intersecting joint thereof by interleaved wood flakes; and hot and flat pressed medium-to-high density and strength cast products such as particleboards, chipboards or the like as disclosed in Hunt et. al. U.S. Pat. No. 4,246,310, Pringle U.S. Pat. No. 3,956,541, McKean U.S. Pat. No. 3,956,555, Fitzgerald et. al U.S. Pat. No. 5,106,666, BIÃ¼mer U.S. Pat. No. 5,059,466, and Shaner et. al. U.S. Pat. No. 4,361,612. These cast products, which are mostly in forms of particleboards or chipboards of planar structures, have smooth-textured flat surfaces as a result of molding process involving high pressing and heating operations.

Considering the inherent properties of the aforementioned particleboards or chipboards, industrial applications specifically those involving decorative arts or crafts as applied to furniture or architectural components or the like, that preferentially require natural looking surface textures and curvatures, would fall beyond their scope and teachings.

For reference to other prior art teachings on particleboard structures, attention is also directed to the McCoy U.S. Pat. No. 3,857,752, Sears et. al U.S. Pat. No. 3,441,959 and Crivelli U.S. Pat. No. 5,258,222.

SUMMARY OF INVENTION

The present invention provides a molded coarse particle product preferentially made from wood flakes, chips or bits which is adapted for use as housewares, furniture and/or architectural components or articles such as decorative tiles, ornamental vases, garden accessories or the like. The invention includes a molded product comprised of coarse particles, preferentially wood bits, flakes, strands or chips, admixed and bonded together with an adhesive binder and lightly cold pressed into a mold preferably manually, together with a reinforcing means in a form of permeable sheet element such as wire mesh, textile, fabric, fiberglass mat or gauze-like materials, being integrally interposed and embedded therein.

It is therefore a primary object of this invention to provide a molded coarse particle product for use as housewares, furniture and architectural components or the like with a surface texture having the natural or original characteristics, that is, in terms of profile, contour, appearance, color and any inherent properties, of the particles comprising thereof such that it looks as natural as the said particles when viewed collectively together in plurality, and the quality and degree of roughness being defined by the natural features of the said particles.

Another object thereof is to provide a molded coarse particle product for use as housewares, furniture and architectural components or the like that is provided with a reinforcing means, giving it the needed structural strength and durability for its intended applications, say, an ornamental vase, chair or table components, decorative wall covering or facing, etc.

Still another object thereof is to provide a molded coarse particle product for use as housewares, furniture and architectural components or the like that is very economical and most practical to manufacture as it only utilizes indigenous materials and simple technology or craftsmanship.

BRIEF DESCRIPTION OF DRAWINGS

Other objects, features and advantages of the invention will be better understood and appreciated from the following detailed description which is made in conjunction with the appended drawings, in which:

FIG. 1 is a cut-away plan view of a preferred embodiment of the invention;

FIG. 2 is a cross-sectional view thereof taken along line 2-2 of FIG. 1; FIG. 2a is an enlarged inset view thereof taken from FIG. 2;

DETAILED DESCRIPTION

Figure 3:
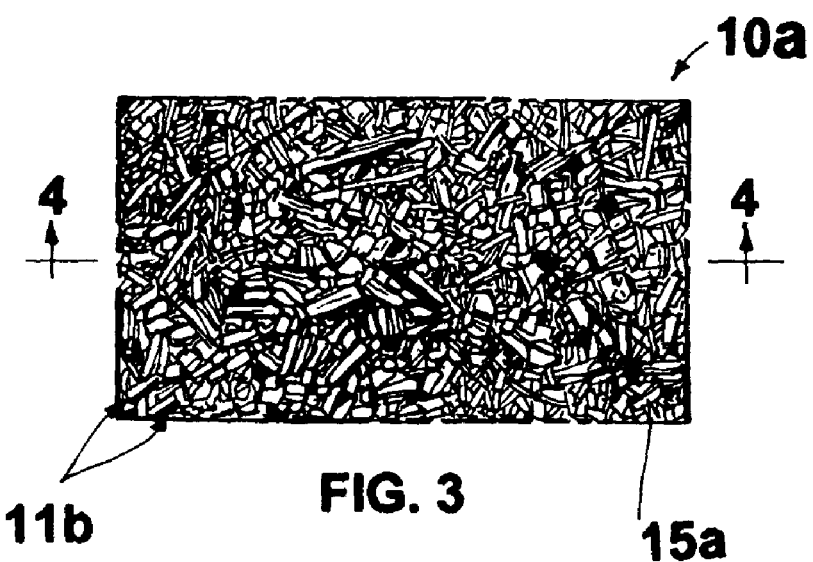
FIG. 3 is a cut-away plan view of another embodiment of the invention.

Before describing the preferred embodiments of the invention in detail, it is to be understood that the phraseology and terminology employed herein are for purposes of description and should not be regarded as limiting.

Referring now to the drawing in which like reference numerals designate the same parts or elements all throughout the succeeding description, there is shown in FIG. 1 a preferred embodiment of a molded coarse particle product for use as housewares, furniture and architectural components or the like generally designated by reference numeral 10 comprising coarse particles 11, preferentially wood bits, flakes or chips 11a, admixed and bonded together with an adhesive binder 12 and lightly cold pressed into a mold preferably manually, together with a reinforcing means 13 in a form of permeable sheet element such as wire mesh, textile, fabric, fiberglass mat or gauze-like materials, being integrally interposed and embedded therein. For relatively smaller molded product or article, it is preferably not provided with reinforcing means 13 since the required body strength thereof is sufficient enough for its intended usage.

The particles 11 that are of random irregular sizes can be in forms of flakes, chips, fragments, pellets, bits, strands or combination thereof of any suitable materials such as wood, glass, plastic, shell, dried grass, or metal, the admixture thereof with the binder 12 being applied into a mold (not shown) that can be of any desired shapes or forms with light pressing pressure, preferably by manual process. The binder 12 is preferably water-based or resin-based.

Figure 4:
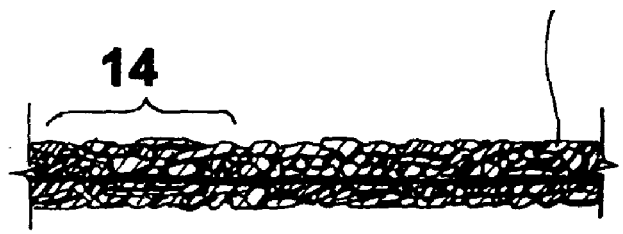
FIG. 4 is a cross-sectional view thereof taken along line 4-4 of FIG. 3.
Figure 5:
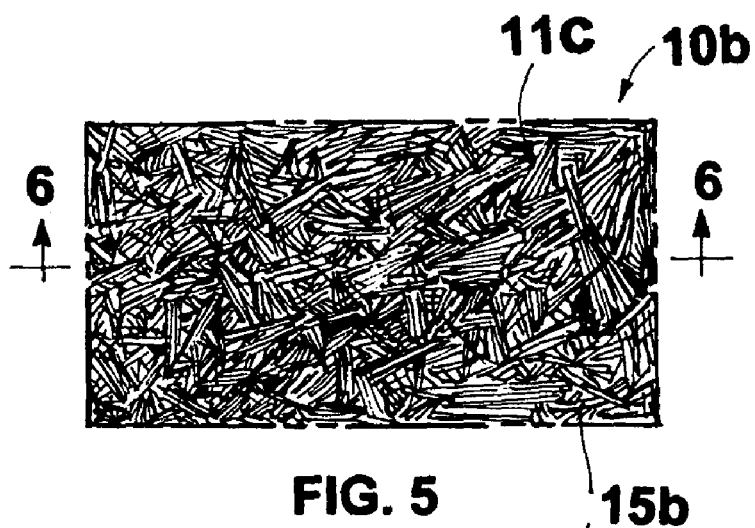
FIG. 5 is a cut-away plan view of still another embodiment of the invention.
Figure 6:
FIG. 6 is a cross-sectional view thereof taken along line 6-6 of FIG. 5.

The surface texture 14 of the product 10 has the natural or original characteristics, that is, in terms of profile, contour, appearance, color and any inherent properties, of the particles 11 comprising thereof such that it looks as natural as the particles 11 when viewed collectively together in plurality, and the quality and degree of roughness being defined by the natural features of the same particles 11. Such product characteristics are illustrated in another embodiments of the invention shown in FIGS. 3 to 6. FIGS. 3 and 4 show the molded particle product generally designated by reference numeral 10*a* that utilizes particles 11*b* in a form of dried grass strands 15*a* cut into small pieces. FIGS. 5 and 6 show the molded particle product generally designated by reference numeral 10*b* that uses particles 11*c* in a form of a needle-like wood chips 15*b*. Both these other embodiments are molded in the same manner as the preferred embodiment shown in FIG. 1.

Figure 7:
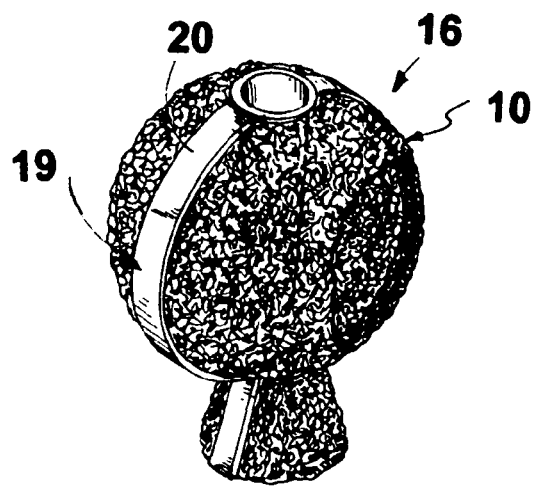
FIGS. 7 to 9 are perspective views of illustrative examples of possible applications of the present invention.
Figure 8:
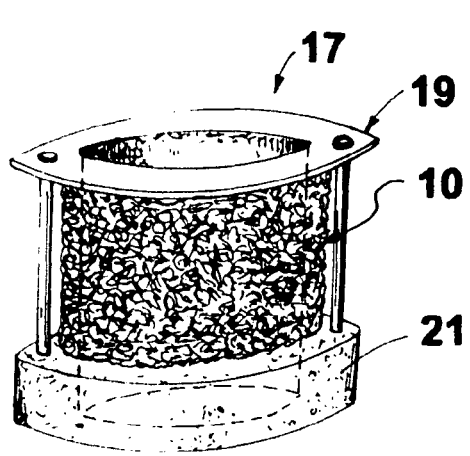
Figure 9:
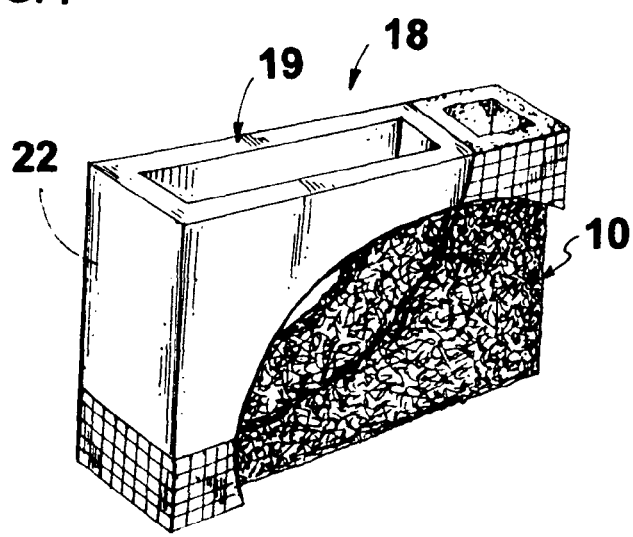

The invention can have various applications as houseware articles such ornamental vases 16 and 17 or utility item holder 18 shown in FIGS. 7 to 9, chair or table components, decorative wall covering or facing, etc. (not shown). In any of these applications, the invention is preferably adopted in combination with other components 19 made of different materials such as metal frame 20, cast stone base 21, complementary part 22 or any other desired elements or structures.

Before defining the scope of the following claims, it is to be understood that the invention is not limited in its application to the details of construction or structure of the components/elements set forth in the preceding description or illustrated in the drawings. It is to be noted that the invention is capable of other embodiments and limitless applications not disclosed herein, and of being practiced and carried out in various ways falling within the teaching and scope of the following claims.

The invention claimed is:

1. A molded coarse particle product comprising:
coarse particles of random irregular sizes bonded together with an adhesive binder and pressed into a mold such that said molded coarse particle product comprises a coarse texture, wherein said coarse particles comprise wood or dried grass; and
a reinforcing means in said molded coarse particle product,
wherein the surface texture of said molded coarse particle product comprises the original contour, the original appearance, or the original color of the coarse particles when the coarse particles of said molded coarse particle product are viewed collectively;
wherein said molded coarse particle product comprises a metal frame or a stone base; and
wherein said molded coarse particle product is an article selected from the group consisting of a utility article holder, an article of furniture, and a decorative houseware article,
wherein said coarse particles are admixed during said bonding, and wherein said pressing is light cold pressing performed manually.

2. A molded coarse particle product according to claim 1, wherein said coarse particles are selected from the group consisting of flakes, chips, fragments, pellets, bits, and strands.

3. A molded coarse particle product according to claim 1, wherein said reinforcing means comprises a permeable sheet element selected from the group consisting of wire mesh, textile, fabric, fiberglass mat, and gauze materials.

4. A molded coarse particle product according to claim 1, wherein said adhesive binder is water-based.

5. A molded coarse particle product according to claim 1, wherein said adhesive binder is resin-based.

6. A molded coarse particle product according to claim 1, wherein said molded coarse particle product comprises (a) coarse particles comprising wood and (b) coarse particles comprising dried grass.

7. A molded coarse particle product according to claim 1, wherein the surface texture of said molded coarse particle product comprises the original contour, the original appearance, and the original color of the coarse particles when the coarse particles of said molded coarse particle product are viewed collectively.

8. A molded coarse particle product according to claim 1, wherein said molded coarse particle product comprises a metal frame and a stone base.

9. A molded coarse particle product according to claim 1, wherein said molded coarse particle product is a utility article holder.

10. A molded coarse particle product according to claim 1, wherein said molded coarse particle product is an article of furniture.

11. A molded coarse particle product according to claim 1, wherein said molded coarse particle product is a decorative houseware article.

12. A molded coarse particle product according to claim 1, wherein said molded coarse particle product comprises flakes and chips.

* * * * *